Patented Mar. 9, 1948

2,437,481

UNITED STATES PATENT OFFICE 2,437,481

ROSIN DERIVATIVES

Alfred L. Rummelsburg, New Castle, Del., assignor to Hercules Powder Company, Wilmington, Del., a corporation of Delaware No Drawing. Application March 21, 1946, Serial No. 656,166

6 Claims. (Cl. 260—97)

This invention relates to new cyclohexanols and more particularly to rosin-substituted cyclohexanols and to a method of producing them.

While many substituted cyclohexanols have been prepared in the past, none have been prepared containing a resin acid substituent.

Now in accordance with this invention it has been found that new substituted cyclohexanols, the rosin-cyclohexanols and rosin ester-cyclohexanols, may be prepared by the catalytic hydrogenation of rosin-phenols or rosin ester-phenols. These new cyclohexanols which are substituted by a rosin or rosin ester are unique in that they contain not only a reactive hydroxyl group in the cyclohexyl radical, but also contain the original carboxyl or ester group of the rosin radical. As a result they undergo many reactions such as further reduction, esterification, etherification, etc., to provide a whole series of new compounds. They are also light-colored resins which are valuable for many purposes as such.

The following examples are illustrative of the new cyclohexanols and of the method of preparing them. All parts and percentages are by weight unless otherwise specified.

Example I

A solution of 1370 parts of N wood rosin in 1000 parts of benzene was added to an agitated solution of 60 parts of boron trifluoride in a mixture of 1350 parts of phenol and 750 parts of benzene, the temperature being held at 10–20° C. during the addition. The mixture was then agitated for 2 hours at 20–30° C. The catalyst was removed by washing the reaction mixture with water at 50–60° C. and the benzene and excess phenol were removed by distillation. The rosin-phenol which remained as a residue amounted to 1785 parts. This material had a phenolic hydroxyl content of 4.0% as determined by the Zerewitinoff method (theory 4.3%); an acid number of 55; a melting point of 140° C. and a color of F on the rosin color scale.

The above rosin-phenol was hydrogenated by dissolving 60 parts of it in 1500 parts of cyclohexane and hydrogenating at a temperature of 220–225° C. and hydrogen pressure of 2000 to 2900 pounds per square inch for 12 hours in the presence of 20 parts of Raney nickel as catalyst. About 1.77% hydrogen was absorbed (theory for the three double bonds in the phenolic end of the condensate is 1.52%). The solution was filtered and the solvent removed by distillation. The rosin-cyclohexanol which remained as a residue had an acid number of 62; hydroxyl content of 4.7% and color of X on the rosin color scale.

Example II

A solution of 453 parts of methyl abietate in 333 parts of benzene was added during 0.5 hour at 10–20° C. to an agitated solution of 20 parts of boron trifluoride in a mixture of 453 parts of phenol in 333 parts of benzene. Agitation was continued at 20–30° C. for a period of 2 hours. The reaction mixture was water-washed to remove the catalyst after which the solvent was removed by distillation. A yield of 528 parts of the rosin ester-phenol having a color of F on the rosin color scale, an acid number of 5, and a phenolic hydroxyl content of 3.2% was obtained.

Fifty parts of the above rosin ester-phenol in 150 parts of cyclohexane was hydrogenated in a stainless steel autoclave at 170° C. in the presence of 20 parts of Raney nickel catalyst at a hydrogen pressure of 2000–2675 pounds per square inch, for a period of about 7.5 hours. About 0.96% hydrogen was absorbed. The solution was filtered and then evaporated to remove the solvent. The rosin ester-cyclohexanol which remained as a residue had an acid number of 2.6; a hydroxyl content of 3.2%; melting point of 65° C. and a color of WW on the rosin color scale.

The rosin-phenols or rosin ester-phenols, which are hydrogenated in accordance with this invention, are prepared by condensing rosin or rosin esters with phenols using a catalyst which will promote the formation of substituted phenols rather than phenol ethers. Suitable catalysts for this purpose are boron trifluoride and hydrogen fluoride. Any rosin material such as wood rosin, gum rosin, polymerized rosin, isomerized rosin, heat-treated rosin, may be used for the preparation of the rosin-phenols. Likewise, the esters of these rosins such as the methyl, ethyl, glycerol, etc., esters may be used for the preparation of the rosin ester-phenols. If desired, the pure resin acids such as the abietic-type and pimaric-type acids or the esters of the resin acids may be utilized in place of the rosin or rosin ester for the preparation of these substituted phenols. The substituted phenols may be prepared from any phenols such as phenol, cresol, butyl phenol, amyl phenol, dialkylhydroxy benzenes, dihydroxy benzenes, naphthols, chlorophenols, nitrophenols, etc., or alkoxyphenols such as guaiacol, etc.

The hydrogenation of the rosin- and rosin ester-phenols is desirably carried out in solution.

The substituted phenol is dissolved in a suitable inert solvent and the solution is then contacted with hydrogen at pressures of from about 40 to 5000 pounds per square inch in the presence of a hydrogenation catalyst. The hydrogenation may be carried out in a continuous or batchwise process. If desired, the hydrogenation may be carried out using molten rosin without the presence of a solvent.

Suitable solvents for the hydrogenation reaction are the inert or neutral solvents such as methanol, ethanol, butanol, diethyl ether, isopropyl ether, cyclohexane, hexane, octanes, gasoline, etc.; however, an organic acidic solvent such as acetic acid may be used. Obviously the solvent used is dependent upon the catalyst employed since it must be inert to the catalyst to prevent destruction of the catalyst. Solvents such as acetic acid, ethers and alcohols are most suitable with the noble metal catalyst. In the case of the nickel and copper chromite catalysts, acetic acid cannot be employed as the solvent because of its reaction with the catalyst, and the inert solvents must be used.

Any active hydrogenation catalyst may be used for the hydrogenation reaction in accordance with this invention, as for example, a noble metal catalyst such as Adams platinum oxide, reduced platinum, reduced palladium, or an active base metal catalyst such as reduced nickel, Raney nickel and copper chromite. The catalyst may be supported, if desired, on a suitable support such as pumice, kieselguhr, silica gel, carbon, etc. When platinum and palladium catalysts are employed, hydrogen pressures of from atmospheric pressure to below 1000 pounds per square inch and temperatures below 100° C. to about 25° C. may be employed. However, in the case of the nickel and copper chromite catalysts, temperatures of from about 125° C. to 250° C. may be utilized as well as hydrogen pressures of above 100 pounds per square inch, preferably about 700 to 5000 pounds per square inch. One of the most preferable catalysts for the hydrogenation reaction in accordance with this invention is Raney nickel, hydrogen pressures of about 500 to 3000 pounds per square inch and temperatures of about 125° C. to about 250° C. being used.

Following the hydrogenation step, the reaction mixture is cooled, removed from the hydrogenation vessel and filtered to separate the catalyst. The solution is then evaporated to remove the solvent, the evaporation desirably taking place under reduced pressure. However, the solvent may be removed by steam distillation or a combination of steam and vacuum distillation. The rosin- or rosin ester-cyclohexanol will remain as a residue by this procedure.

The rosin- and rosin ester-cyclohexanols are amorphous, light-colored resins having melting points between 50° C. and 150° C. They cannot be readily distilled even under reduced pressure. In general, they have a color of WW to X on the rosin color scale as compared to a color of D to F of the corresponding rosin- and rosin ester-phenols.

The rosin- and rosin ester-cyclohexanols may be subjected to further hydrogenation to saturate the remaining double bond in the rosin substituent. The hydrogenation of the rosin group may be carried out directly following the hydrogenation of the aromatic phenol ring if desired by continuing the hydrogenation for a longer period of time. Either the original catalyst or fresh catalyst may be employed. In the case of the rosin-cyclohexanols, the hydrogenation may also be continued to reduce the carboxyl group of the rosin substituent to an alcoholic group, thereby producing a compound containing a reactive hydroxyl group in both the cyclohexyl radical and the rosin radical. In this case, a catalyst such as reduced copper chromite is desirable.

The rosin- and rosin ester-cyclohexanols may be sulfated to form wetting agents and detergents. The rosin-cyclohexanols may also be reacted with mono- and poly-basic acids to form resinous esters which in turn may be esterified at their carboxylic groups with mono- and polyhydric alcohols to form products suitable for use as plasticizers and resins for coatings and adhesives. The rosin- and rosin ester-cyclohexanols may be oxidized with nitric acid, etc., to form substituted adipic acids which are dibasic acids useful in preparing alkyd resins, etc. The rosin-cyclohexanols may also be used for preparing modified alkyd resins by esterifying the carboxyl group with a polyhydric alcohol and esterifying the secondary hydroxyl group with a suitable unsaturated fatty acid such as the soybean, linseed, dehydrated castor, tung, etc., fatty acids.

What I claim and desire to protect by Letters Patent is:

1. A cyclohexanol selected from the group consisting of rosin- and rosin ester-cyclohexanols.
2. A rosin-cyclohexanol.
3. A rosin ester-cyclohexanol.
4. The process of preparing a cyclohexanol which comprises contacting a solution of a substituted phenol, selected from the group consisting of rosin-phenols and rosin ester-phenols, in a solvent at a temperature of from about 25° C. to about 250° C. with hydrogen in the presence of a hydrogenation catalyst.
5. The process of preparing a cyclohexanol which comprises contacting a solution of a substituted phenol, selected from the group consisting of rosin-phenols and rosin ester-phenols, in an inert solvent at a temperature of about 25° C. to about 250° C. with hydrogen under a pressure of from atmospheric pressure to about 5000 pounds per square inch in the presence of a hydrogenation catalyst.
6. The process of preparing a cyclohexanol which comprises contacting a solution of a substituted phenol, selected from the group consisting of rosin-phenols and rosin ester-phenols, in an inert solvent at a temperature of about 125° C. to about 250° C. with hydrogen under a pressure of about 500 pounds to about 3000 pounds per square inch in the presence of Raney nickel.

ALFRED L. RUMMELSBURG.

REFERENCES CITED

The following references are of record in the file of this patent:

UNITED STATES PATENTS

| Number | Name | Date |
|---|---|---|
| 2,121,294 | Humphrey | June 21, 1938 |

Certificate of Correction

Patent No. 2,437,481. March 9, 1948.

ALFRED L. RUMMELSBURG

It is hereby certified that error appears in the printed specification of the above numbered patent requiring correction as follows: Column 2, line 35, for the word "phenol" read *phenyl*; and that the said Letters Patent should be read with this correction therein that the same may conform to the record of the case in the Patent Office.

Signed and sealed this 27th day of April, A. D. 1948.

[SEAL]

THOMAS F. MURPHY,
*Assistant Commissioner of Patents.*